United States Patent [19]

Böttcher

[11] 4,315,792

[45] Feb. 16, 1982

[54] METHOD OF PRODUCING A BOND BETWEEN TWO SURFACES

[75] Inventor: Hugo Böttcher, Hanover, Fed. Rep. of Germany

[73] Assignee: J. H. Benecke GmbH, Hanover, Fed. Rep. of Germany

[21] Appl. No.: 35,577

[22] Filed: May 3, 1979

[30] Foreign Application Priority Data

May 5, 1978 [DE] Fed. Rep. of Germany ....... 2819576

[51] Int. Cl.$^3$ .............................. C09J 5/00; C09J 7/00
[52] U.S. Cl. ............................... 156/306.6; 156/309.6; 156/313
[58] Field of Search ..................... 156/309, 313, 306.6, 156/309.3, 309.6, 309.9

[56] References Cited

U.S. PATENT DOCUMENTS

| | | | |
|---|---|---|---|
| 2,699,417 | 1/1955 | Repsher et al. | 156/313 |
| 2,955,974 | 11/1960 | Allen et al. | 156/309 |
| 3,026,229 | 3/1962 | Wilcox | 156/309 |
| 3,900,360 | 8/1975 | Leatherman | 156/309 |
| 4,088,805 | 5/1978 | Wiegand | 156/306.6 |

*Primary Examiner*—Edward C. Kimlin
*Assistant Examiner*—Louis Falasco
*Attorney, Agent, or Firm*—Schwartz, Jeffery, Schwaab, Mack, Blumenthal & Koch

[57] ABSTRACT

A method of producing a surface connection or bond between two surfaces, the first surface being at least partially formed of polypropylene and the second surface being formed of a dissimilar material, wherein the second surface is laminated with a textile surface structure formed predominantly of polypropylene fibres, the thus laminated second surface and the first surface then being connected to one another by the application of heat and pressure.

6 Claims, No Drawings

METHOD OF PRODUCING A BOND BETWEEN TWO SURFACES

The present invention relates to a method of bonding two surfaces together, one surface being at least partially formed of polypropylene and the other surface being of dissimilar material.

The term "polypropylene" as used herein refers to the isotactic modification of this polymer which is used for producing foils or sheets, panels and fibres. Because of its non-polar structure, polypropylene has a low reactive surface with a marked non-adhesive character. Conventional adhesive, welding and laminating techniques therefore fail when attempts are made to connect an object which has a surface formed, at least to some extent, of polypropylene in a flat manner to an object made of a dissimilar material so as to form a secure bond.

The present invention therefore seeks to provide a method of producing a flat-surfaced bond between polypropylene and dissimilar materials.

According to the present invention, there is provided a method of producing a surface connection of bond between two surfaces, the first surface being at least partially formed of polypropylene and the second surface being formed of a dissimilar material, wherein the second surface is laminated with a textile surface structure formed predominantly of polypropylene fibres, the thus laminated second surface and the first surface then being connected to one another by the application of heat and pressure.

It is known per se to laminate material with a polypropylene fibre structure. Such laminating is usually effected by means of laminating pastes or adhesives. For most of these laminations suitable laminating means are available, e.g. solvent based or in plastisol form. However, these laminating means are not effective on smooth polypropylene surfaces. Laminating polypropylene fibre structures onto other materials, such as PVC sheets or foil is, however, possible because the laminating means has good adhesion to the other material and, during the laminating operation, enters the loose matrix of the polypropylene fibre structure so as to enclose the polypropylene fibres. The polypropylene fibre structure is therefore securely mechanically anchored on other other material.

This possibility is utilised in a preferred aspect of the present invention. If the dissimilar material is laminated on the rear surface with polypropylene fibres and is then pressure-bonded at a sufficiently high temperature with the polypropylene-containing surface, the polypropylene fibres securely anchored to the dissimilar material act on the polypropylene-containing surface in the matter of a fusion adhesive. They fuse autogenically with the polypropylene-containing surface so as to produce a substantially whole-surface bond of the dissimilar material to the surface which is polypropylene-containing.

The polypropylene fibre structure may be in the form of a woven or knitted fabric. Preferably, however, a bonded endless polypropylene fleece free of agglutinate or binder is employed.

By utilising the process of the present invention, panels, foils or sheets of polypropylene mixed with fillers may be provided with a decorative surface of polymer foils or sheets which may be expanded or foamed is desired. These foils or sheets may be optionally dyed, printed and/or embossed. The polymer foils or sheets may be made of polyvinyl chloride (PVC) or an acrylonitrile-butadiene-styrene (ABS) mixed polymerisate.

The method in accordance with the invention may expediently be carried out in that a plastics material structure laminated on its rear surface with polypropylene, such as a PVC sheet laminated with a polypropylene fleece is brought together with a polypropylene-containing surface structure such as a filled polypropylene sheet freshly produced from a polypropylene melt by, for example, extrusion; the two surfaces being bonded together with the application of pressure in, for example, a laminating cylinder gap, before the surface of the polypropylene-containing surface structure has cooled to below its plasticising temperature.

A particularly favourable use of the method in accordance with the present invention is in the production of deep-drawn shaped articles, since a bonded surface structure produced from polypropylene and PVS or ABS has extremely good deep drawing properties. The joining of the polypropylene-containing surface structure and the dissimilar material laminated with polypropylene fibres is effected, in such a case, in the deep-drawing mould simultaneously with the deep drawing operation. It should, however, be ensured that both the polypropylene-containing surface and the polypropylene fibres have been heated to above their plasticising temperatures.

I claim:

1. A method of bonding a surface formed at least partially of polypropylene to a surface formed of a dissimilar plastic material which does not readily bond to polypropylene; said method comprising adhesively laminating a polypropylene fiber textile web to said dissimilar plastic material surface with an adhesive which has good adhesion to said dissimilar plastic material and which penetrates the polypropylene fiber web and encloses some of the polypropylene fibers to firmly anchor the textile web to the dissimilar plastic material; and thereafter heating the laminated fiber web and the polypropylene surface to a temperature above the plasticizing temperature of the polypropylene surface and pressing the laminated polypropylene fiber web in contact with the polypropylene surface to bond the laminated fiber web and dissimilar plastic material to the polypropylene surface.

2. A process according to claim 1, wherein said dissimilar plastic material is a polyvinyl chloride sheet.

3. A process according to claim 1, wherein said dissimilar plastic material is an acrylonitrile-butadiene-styrene sheet.

4. A process according to claim 1, wherein the adhesively laminated dissimilar plastic material and polypropylene fiber textile web are bonded to a polypropylene-containing surface freshly produced from a polypropylene melt before the polypropylene-containing surface has cooled to below its plasticizing temperature.

5. A process according to claim 1 or 4, wherein sai polypropylene fiber textile web is an endless polypropylene fiber fleece bonded without bonding agent.

6. A process according to claim 1 or 4, wherein the bonding of the laminated polypropylene fiber web and the polypropylene surface is effected simultaneously with a deep-drawing operation to form a shaped deep-drawn article.

* * * * *